US008658233B2

(12) United States Patent
Abylov et al.

(10) Patent No.: US 8,658,233 B2
(45) Date of Patent: Feb. 25, 2014

(54) APPARATUS FOR DEPOSITING A CONFECTIONERY MASS, AND METHOD OF PRODUCING A CONFECTIONERY PRODUCT

(75) Inventors: Melis Abylov, Munich (DE); Juraj Durco, Zalesie (SK)

(73) Assignee: Kraft Foods R&D, Inc., Deerfield, IL (US)

( * ) Notice: Subject to any disclaimer, the term of this patent is extended or adjusted under 35 U.S.C. 154(b) by 683 days.

(21) Appl. No.: 12/176,091

(22) Filed: Jul. 18, 2008

(65) Prior Publication Data

US 2009/0020566 A1    Jan. 22, 2009

(30) Foreign Application Priority Data

Jul. 20, 2007    (EP) .................................. 07 014 288

(51) Int. Cl.
| | | |
|---|---|---|
| *A23G 3/20* | (2006.01) | |
| *A23G 1/00* | (2006.01) | |
| *A23L 1/09* | (2006.01) | |
| *A23G 3/02* | (2006.01) | |
| *A23G 3/00* | (2006.01) | |
| *A23L 1/00* | (2006.01) | |
| *A23P 1/00* | (2006.01) | |
| *A22C 7/00* | (2006.01) | |
| *A47J 43/18* | (2006.01) | |

(52) U.S. Cl.
USPC ........... 426/512; 426/306; 426/516; 426/103; 426/572; 426/660; 99/426; 99/427

(58) Field of Classification Search
USPC .............. 426/512, 306; 99/426, 427
See application file for complete search history.

(56) References Cited

U.S. PATENT DOCUMENTS

| 2,082,313 | A |   | 6/1937 | Todd |
|---|---|---|---|---|
| 2,122,703 | A |   | 7/1938 | Weinreich |
| 2,425,431 | A | * | 8/1947 | Le Vangie ..................... 426/103 |
| 2,650,551 | A |   | 9/1953 | Eckels et al. |
| 4,368,684 | A |   | 1/1983 | Launay |
| 4,384,678 | A |   | 5/1983 | Bouette |
| 4,542,028 | A | * | 9/1985 | Butcher et al. ................ 426/100 |

(Continued)

FOREIGN PATENT DOCUMENTS

| DE | 3608623 A1 | 9/1987 |
|---|---|---|
| DE | 60118932   | 4/2007 |

(Continued)

OTHER PUBLICATIONS

Bjorn Groh; European Search Report, Jan. 15, 2008, Munich.

(Continued)

*Primary Examiner* — Rena Dye
*Assistant Examiner* — Assaf Zilbering
(74) *Attorney, Agent, or Firm* — Fitch, Even, Tabin & Flannery LLP

(57) ABSTRACT

An apparatus for depositing a confectionery mass comprising at least one discharge passageway extending to at least one elongate discharge outlet, wherein at least one discharge passageway diverges in a direction towards the discharge outlet, and a machine for producing a confectionery product having at least one such apparatus for depositing. In a method of producing a confectionery product, the confectionery mass is deposited as at least one strip having a width in the range of 5 to 500 mm and/or thickness in the range of 0.5 to 100 mm.

15 Claims, 1 Drawing Sheet

(56) References Cited

U.S. PATENT DOCUMENTS

| | | | |
|---|---|---|---|
| 4,715,275 A | 12/1987 | Getman | |
| 5,000,969 A | 3/1991 | Beer | |
| 5,019,404 A | 5/1991 | Meisner | |
| 6,436,455 B2 | 8/2002 | Zietlow et al. | |
| 6,951,660 B2 * | 10/2005 | Brown et al. | 426/101 |
| 2002/0102333 A1 * | 8/2002 | Klug et al. | 426/93 |
| 2004/0170751 A1 | 9/2004 | Roy et al. | |
| 2004/0247761 A1 | 12/2004 | Zietlow et al. | |
| 2009/0022866 A1 | 1/2009 | Abylov et al. | |
| 2009/0285954 A1 | 11/2009 | Simbuerger et al. | |

FOREIGN PATENT DOCUMENTS

| | | | |
|---|---|---|---|
| EP | 0366978 | | 5/1990 |
| EP | 0494384 | A2 | 7/1992 |
| EP | 0730826 | A1 | 9/1996 |
| EP | 1171001 | A1 | 1/2002 |
| EP | 1354519 | A1 | 10/2003 |
| EP | 1673978 | A1 * | 6/2006 |
| GB | 18424 | | 0/1913 |
| GB | 166296 | | 7/1921 |
| GB | 376328 | A | 6/1932 |
| GB | 666635 | | 2/1952 |
| GB | 1145854 | | 3/1969 |
| GB | 2164727 | A | 3/1986 |
| GB | 2283699 | A * | 5/1995 |
| JP | 2000210028 | A | 8/2000 |
| JP | 2002153212 | A | 5/2002 |
| RU | 2140745 | C1 | 11/1999 |
| RU | 2269899 | C2 | 2/2006 |
| SU | 561315 | | 6/1979 |
| WO | 03043437 | A1 | 5/2003 |
| WO | 2004056191 | A1 | 7/2004 |

OTHER PUBLICATIONS

European Patent Office, Communication of the European Search Report and Search Opinion for European Patent Application No. 07014288, dated Jul. 23, 2009, 11 pages.

* cited by examiner

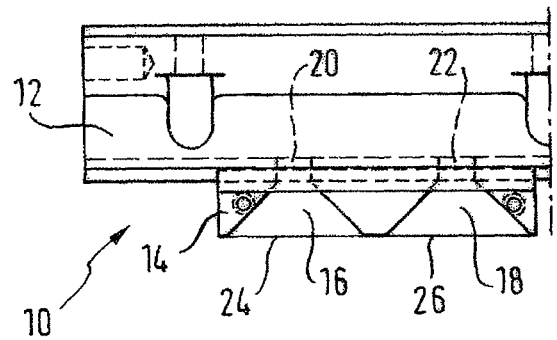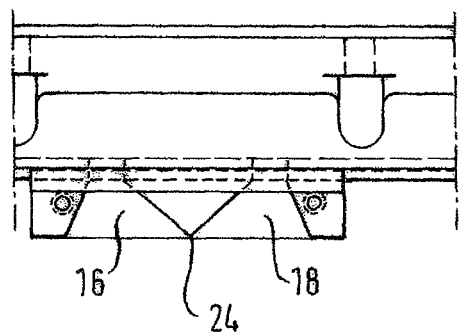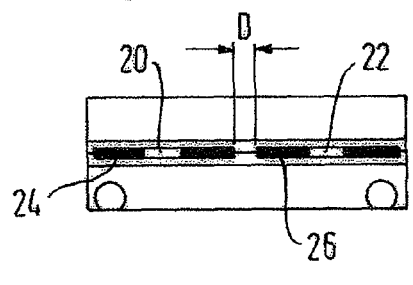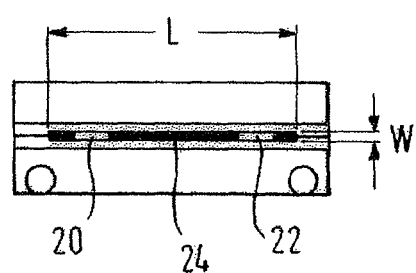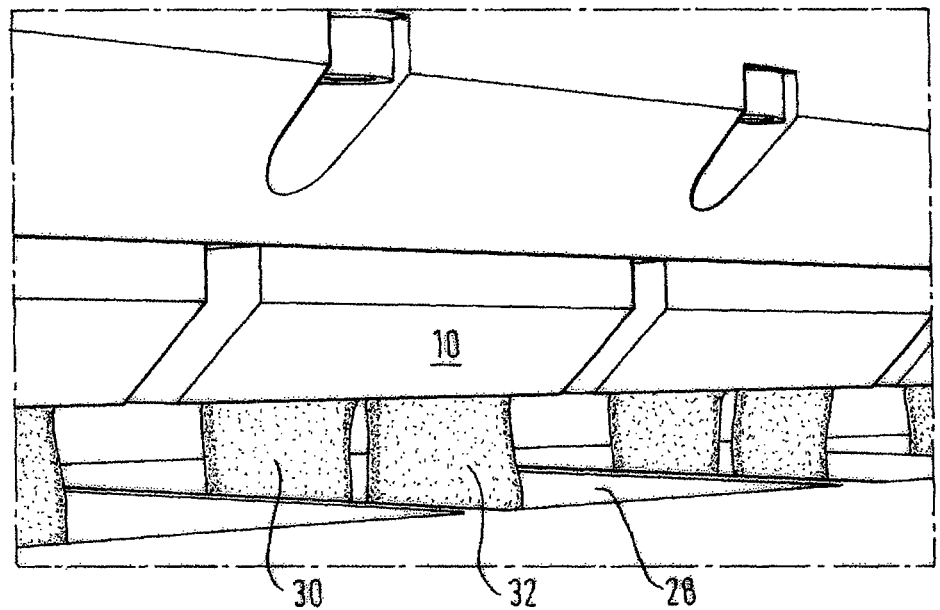

APPARATUS FOR DEPOSITING A CONFECTIONERY MASS, AND METHOD OF PRODUCING A CONFECTIONERY PRODUCT

CROSS-REFERENCE TO RELATED APPLICATION

This application claims the benefit of European Patent Application No. 07014288.0, filed Jul. 20, 2007, now European Patent No. EP 2016837.

TECHNICAL FIELD

The invention relates to an apparatus for depositing a confectionery mass, and a method of producing a confectionery product. In particular, this invention is related to depositing of fat-containing aerated confectionery mass including but not limited to aerated chocolate.

In the field of producing confectionery products, such as chocolate tablets or bars, as well as products enrobed with chocolate, a confectionery mass such as a chocolate mass is deposited into molds or on the products to enrobe them. In connection with the production of chocolate bars or tablets, it is known to deposit an aerated chocolate mass, i.e., a chocolate mass having gas bubbles in it to produce an aerated chocolate, i.e., a chocolate including gas bubbles.

BACKGROUND ART

Various pressurized apparatuses for depositing aerated chocolate mass are known: shaft-type manifold depositors with the shaft oscillating about its horizontal axis, piston depositors, gallery-type manifold depositors with shut-off valves, etc.

GB 2 164 727 A is related to a manifold assembly, with a shaft actuated to move in reciprocating motion, for supplying a substance, such as molten chocolate, having a plurality of nozzles which substantially have the shape of a tube.

GB 376 328 describes an apparatus for depositing chocolate into molds with a nozzle which extends across the width of the machine and that is provided with a series of separated longitudinal chambers or passageways.

Similarly, U.S. Pat. No. 4,384,678 describes a manifold depositor for aerated chocolate, where discharge outlets of product galleries are closed off either from the inside by rod-shaped valves or from the outside by a sliding plate having a tapered aperture therein.

Furthermore, pressurized piston depositors of those known in the art are widely commercialized for depositing aerated chocolate.

SUMMARY OF THE INVENTION

The invention provides an apparatus for depositing a confectionery mass allowing improved production process for a confectionery product, particularly an aerated confectionery product including but not limited to aerated chocolate. Moreover, a method for producing a confectionery product is provided.

Accordingly, the novel apparatus for depositing aerated confectionery mass has at least one discharge passageway extending into at least one discharge outlet. The discharge outlet is essentially a slit, and is formed either at the shaft or inside an elongated nozzle by diverging the discharge passageway in the longitudinal direction of the shaft or the slit. Advantageously, the inner surface of the discharge outlet is situated as close as possible to the product shut-off point at the shaft to minimize the formation of product tails after the shut-off.

It is noted that the length of the discharge outlet may extend substantially perpendicular to a direction in which molds or any other molding means is moved relative to the discharge outlet, hence the confectionery mass can be deposited into the molds in the shape of relatively wide strips.

This differs from the currently known method, in which the aerated confectionery mass is usually deposited as a type of pile and is shaken or vibrated afterwards to evenly distribute the confectionery mass in the molds. Particularly with aerated chocolate masses this shaking or vibrating has a negative de-aeration effect. In contrast, with the depositor described herein a relatively wide strip of aerated confectionery mass can be deposited in the mold. Consequently, the need for shaking or vibrating is minimized and the extent of de-aeration for aerated confectionery mass may be significantly reduced. Furthermore, a number of discharge outlets can be provided adjacent to each other to deposit a plurality of adjacent strips of confectionery mass. This also allows the mold bottom to be completely covered with confectionery mass in cases when confectionery mass is deposited into one mold from several discharge outlets.

Moreover, tests showed that advantages are provided when the discharge passageway extending either inside the shaft or in the nozzle towards the opening diverges in the longitudinal direction of the discharge outlet. Hence, at the discharge extremity of the passageway one or more openings are provided having an elongate shape with a longitudinal direction extending along their length. The dimension of the discharge passageway along this longitudinal direction is smaller at the inlet end of the discharge passageway either inside the shaft or in the nozzle. In other words, the diverging discharge passageway is either formed in the shaft, or in the nozzle surrounding the shaft. As an alternative, the nozzle having the diverging discharge passageway may be formed so as to allow one or more pistons, manifold depositors or similar devices to deliver the confectionery mass to the nozzle.

As described herein, from the inlet to the outlet, the discharge passageway diverges in the longitudinal direction of the discharge outlet. This measure has proven to lead to a superior deposition of a confectionery mass in form of wide strips. Whenever required for product quality and/or necessitated by mass flow properties an arcuate cut-off point on the oscillating shaft, as opposed to a straight-line cutoff point, can provide for wide strips of rectangular shape.

As regards the width direction of the discharge outlet, the discharge passageway may also expand in this direction, as seen towards the opening. However, the discharge passageway may also become narrower in the width direction, as seen towards the opening. As regards the cross-sectional area of the discharge passageway, it may increase towards the opening. Generally, in a plan view, the discharge passageway can be described to have the shape of a fishtail. Described three-dimensionally, the passage is a hollow truncated pyramid, with the discharge outlet constituting the base, and the inlet end of the discharge passageway constituting the upper part of the pyramid. At their inlet ends, a plurality of discharge passageways can be in contact with a manifold serving to distribute the confectionery mass to a plurality of passageways. As an alternative, one or more pistons may be provided to supply the confectionery mass to the passageways.

Moreover, with the novel depositor the fat and/or emulsifier content may advantageously be reduced as these ingredients are no longer necessary at the same amount to ensure a certain mass viscosity which was previously needed to facilitate a uniform distribution of the confectionery mass in the means for molding.

Preferred embodiments are described in the dependent claims.

Experiments have shown that advantages in mold coverage may be achieved when at least one discharge passageway diverges substantially symmetrically with respect to a direction towards the discharge outlet, which may substantially correspond to the flow direction of the confectionery mass, particularly with respect to the flow direction from the center of the inlet opening to the center of the outlet opening inside the discharge passageway.

Whereas each discharge passageway may extend to a single discharge outlet, two or even more discharge passageways may extend to a single discharge outlet. In particular, two or more discharge passageways can "merge" at the discharge outlet. This advantageously allows the flowing conditions to be determined by the respective discharge passageway. At the same time, an extremely wide strip of confectionery mass can be deposited through a single, relatively long discharge outlet, to which confectionery mass is supplied by a plurality of discharge passageways.

As regards the width of the discharge outlet, i.e., its dimension perpendicular to the longitudinal direction, experiments showed that a width greater than 0.5 mm and smaller than 3 mm, preferably between about 1 mm and 2.5 nun, ideally about 2 mm, is advantageous for the purpose of depositing aerated chocolate mass. It is assumed that with a width in the described range, compressed gas bubbles within the aerated chocolate mass are not readily ruptured by the confines of the discharge outlet, and advantageous flow conditions can be realized.

It may be advantageous to provide at least one discharge passageway with a surface roughness of less than 6.3 μm. It is expected that such a comparably smooth internal surface of the discharge passageway will aid in preventing gas bubbles from being ruptured by rough inner surface and by confines of product passageway and discharge outlet. In this context, it may, furthermore, be advantageous to provide a complete or substantially complete product passageway, i.e., any passageways, apart from the discharge passageway, through which the product, i.e., the confectionery mass, preferably the aerated chocolate, flows, with the above-mentioned maximum roughness. This will further aid in preventing gas bubbles from being ruptured.

In a machine for producing a confectionery product, having at least one depositor as described herein, the mentioned advantages can be obtained. Particularly, in such a machine a vibrator for shaking or vibrating molds to uniformly distribute confectionery mass over the entire mold or any other molding means can be eliminated.

In a preferred embodiment, the machine for producing confectionery products mentioned herein has a conveyor for moving a plurality of molds relative to one or more depositors.

Corresponding advantages can be realized by a method of producing a confectionery product involving at least one depositor as described herein.

Moreover, a method of producing a confectionery product is described herein, in which a confectionery mass is deposited in the shape of a strip having a width in the range of 5 to 500 mm and/or a thickness in the range of 0.5 to 100 mm. The maximum ranges for strip width and thickness relate to blocks of industrial chocolate utilized for further processing. As outlined above, by depositing the confectionery mass as a strip, in contrast to a thick and/or narrow pile, a mold may be substantially filled to the brim with an aerated chocolate mass without the need for shaking or vibrating the mold to distribute the deposited mass. As known from the industry, the piles of aerated chocolate mass expand in molds right after depositing due to the gas expansion at atmospheric conditions, however the extent of gas expansion does not compensate for the pile's uneven shape to produce level bottom of a chocolate bar. In connection with the desired strip shape of the deposited confectionery product, a ratio of width/thickness of above 5 is currently preferred.

As mentioned, it is currently preferred that the confectionery mass is an aerated chocolate mass, as this invention can be realized to the fullest advantage when an aerated chocolate product is produced. This type of product has essentially the same visual appearance as non-aerated confectionery products but with a lower density. In particular, the density may be decreased by approximately 10% versus the density of "regular", i.e., non-aerated control chocolate mass. Moreover, the aeration level may vary in the range of, for example, 8% to 13%, preferably 9% or 12%. Due to the decreased density the product, having the same mass as a comparative non-aerated product, appears bigger than a comparative non-aerated product. This effect may cause consumers to choose the aerated product. As mentioned, the method described herein allows the production of aerated confectionery products, if desired with particle inclusions, in an efficient manner.

It is, moreover, currently preferred to use the novel depositor in a method of depositing the confectionery mass in at least one mold moving relative to the depositor.

In this context, it is desirable to completely fill the mold in the direction substantially perpendicular to its moving direction, particularly a horizontal direction. Tests showed that this can advantageously be realized when an opening of the discharge outlet is less than 20 mm away from the molds and preferably the clearance between the upper rim of the mold and the discharge outlet is in the range of 2 to 10 mm.

Based on the above finding, it was proven to be particularly advantageous when the mold is substantially completely filled with the confectionery mass in a direction perpendicular to the direction of its relative movement. In other words, one or more strips are deposited, for example adjacent to each other, to completely fill the mold in the horizontal direction.

The method described herein may advantageously be utilized for producing of multi-layered confectionery product in molds, preferably with aerated chocolate mass where layers of chocolate may be interspersed with any additional components such as nuts, raisins, biscuits, crisps, wafers, etc.

As mentioned before, the depositor as described herein may advantageously also be used in a method of coating or enrobing an additional component of a confectionery product, such as wafers, buns, cereal bars, cakes, biscuits, etc. In particular, as the novel depositor deposits strips of confectionery mass and as gaps may be provided between adjacent strips, these gaps may be arranged to correspond between a plurality of additional components arranged in rows. Thus, the "curtain" of confectionery mass can advantageously be provided merely at those positions where rows of wafers, etc. are moved through the machine, and the confectionery mass is not deposited in the gaps between wafers. This reduces the amount of confectionery mass which has to be recovered as it cannot be used to enrobe wafers.

BRIEF DESCRIPTION OF THE DRAWINGS

Hereinafter the invention will be described by non-limiting examples thereof and with reference to the drawings in which:

FIG. 1 is a plan view of a first embodiment of a discharge passageway;

FIG. 2 is a plan view of a second embodiment of a discharge passageway;

FIG. 3 is a bottom view of the discharge passageway of FIG. 1;

FIG. 4 is a bottom view of the discharge passageway of FIG. 2; and

FIG. 5 is a perspective view of a depositor during operation.

DETAILED DESCRIPTION OF PREFERRED EMBODIMENTS OF THE INVENTION

With reference to FIG. 1, an apparatus 10 may include a manifold 12 and one or more nozzles 14. The manifold 12 serves to accommodate confectionery mass, such as chocolate mass, and to distribute same to the one or more nozzles 14. From the manifold, the confectionery mass flows into discharge passageways 16, 18 through respective inlets 20, 22. The discharge passageways 16, 18 supply the confectionery mass to discharge outlets 24, 26, which can be seen more clearly in FIG. 3. As can be seen in FIG. 3, the discharge outlets 24, 26 have an elongate shape, with their longitudinal direction L (see FIG. 4) extending transversely to form a "merged" discharge outlet in FIG. 3. In FIG. 3 the respective inlet 20, 22 is additionally shown.

As can be taken from FIG. 1, the discharge passageways 16, 18 diverge in the longitudinal direction of the discharge outlets 24, 26, i.e., in the transverse direction of FIG. 1. Thus, a kind of fishtail-shape is realized. In the embodiment of FIGS. 1 and 3, the discharge passageways 16, 18 diverge substantially symmetrically to the flowing direction of the confectionery mass, i.e., to the vertical direction as shown in FIG. 1. Moreover, discharge passageways 16, 18 supply the confectionery mass to separate discharge outlets 24, 26.

In contrast, in the embodiment of FIG. 2, the discharge passageways 16, 18 are asymmetric and merge before the discharge outlet 24, so that the confectionery mass is supplied to a single discharge outlet 24 through both discharge passageways 16, 18.

In FIG. 4 the elongate discharge outlet and the two separate inlets 20, 22 are shown again. As regards the sizes of the discharge outlets, the discharge outlet of the embodiment of FIG. 4 may, for example, have a length L of approximately 70 mm, and a width W of approximately 2 mm. The same width can be present in the embodiment of FIGS. 1 and 3. In the embodiment of FIGS. 1 and 3, each discharge outlet 24, 26 may have a length of approximately 40 mm and a distance D between the discharge outlets of approximately 10 mm.

FIG. 5 shows the apparatus 10 described herein in operation. The discharge outlets may, for example, face vertically downwards and towards a series of molds 28 which are moving underneath the apparatus 10 in a substantially horizontal direction. Through the discharge outlets, strips 30, 32 of confectionery mass are deposited in the molds 28 to fill the molds substantially completely without the need of shaking or vibrating the mold 28, even if the fat and/or emulsifier content of the confectionery mass is relatively low. Moreover, when the confectionery mass is an aerated mass, the de-aeration of the deposited mass induced by shaking or vibrating can be minimized. The clearance between the discharge outlet and the upper rim of the mold 28 may be relatively small, for example about 10 mm, to achieve a substantially complete filling of the mold by the strips of deposited confectionery mass, even if the strip width narrows in the course of downward motion between the discharge outlet and the means of molding.

EXAMPLE

In order to conduct tests and experiments, in connection with the method described herein, three different recipes of known milk chocolate masses of the applicant were prepared. The masses were aerated and deposited into molds related to known products of the applicant through depositors having discharge outlets with a width of about 2 mm, as described above. As described herein, depositing was carried out in a layered manner. During experiments the first layer constituted approximately 30% of the total weight of the chocolate tablet. In connection with the experiment, whole hazelnuts were placed onto the first layer by hand and constituted approximately 20% of the total weight of the tablet. In the described test run, the molds were again put under the apparatus for depositing the aerated chocolate mass and a second layer of chocolate mass, constituting approximately 50% of the total weight of the tablet, was placed onto the first layer and the hazelnuts. During de-molding, i.e., removing the tablets from the molds, no problems were observed. Moreover, some of the samples were examined with regard to their density by water displacement and the density was found to be 9% to 13% lower than that of a control mass. Determining the density by water displacement is conducted by putting the sample into a container, which is filled with water to the brim, and collecting the water which is displaced when the sample is put into the container. Thus, the volume of the product can be measured by determining the volume of water which has been displaced, the weight of the product can be determined by weighing and the density can be calculated.

Moreover, with similar samples, the aeration level has been determined by X-ray tomography. This involves the analysis of a picture made of the cut face of a sample product. In such a picture, the gas bubbles appear significantly lighter than the chocolate. Thus, the picture can be digitalized and analyzed to determine that portion of the cut surface which corresponds to gas bubbles. In this way, it was found that the aeration level is between 8% and 13%, particularly about 12%.

The invention claimed is:

1. A method of producing an aerated chocolate mass, the method comprising:
   depositing a flowing aerated chocolate mass as at least one strip into at least one mold to completely fill the mold in a horizontal direction, the strip having a width in the range of 5 to 500 mm and a thickness in the range of 0.5 to 100 mm; and
   moving a plurality of molds relative to an apparatus for depositing the aerated chocolate mass,
   wherein shaking or vibrating the plurality of molds or the at least one strip deposited in the molds is not required to distribute the aerated chocolate mass throughout the molds and wherein the extent of de-aeration for the aerated chocolate mass in the molds is reduced as compared to the same chocolate mass that undergoes shaking or vibrating in the molds.

2. The method in accordance with claim 1, wherein the aerated chocolate mass is discharged in a vertical direction to fill the mold completely in a horizontal direction.

3. The method in accordance with claim 2, wherein the at least one strip is deposited using at least one discharge outlet of the apparatus for depositing the confectionery mass spaced at a clearance less than 20 mm from an upper rim of the mold.

4. The method in accordance with claim 3, wherein the clearance is in the range of 2 to 10 mm.

5. The method in accordance with claim 1, comprising depositing an additional component at least once after depositing the confectionery mass, and again depositing the confectionery mass at least once thereafter to form a multi-layered product, wherein the component is selected from the group consisting of nuts, raisins, biscuits, crisps, and wafers.

6. The method in accordance with claim 1, comprising enrobing with the confectionery mass an additional component of a confectionery product, the component is selected from the group consisting of wafers, buns, cereal bars, cakes, and biscuits.

7. The method in accordance with claim 1, wherein the aerated confectionery product has an aeration level of at least 8 percent.

8. A method of producing an aerated chocolate mass, the method comprising:
 depositing a flowing aerated chocolate mass into at least one of a plurality of molds that is moving relative to the aerated chocolate mass as at least one strip having a width in the range of 5 to 500 mm and a thickness in the range of 0.5 to 100 mm;
 wherein shaking or vibrating the molds or the at least one flowing strip deposited in the mold is not required to distribute the aerated chocolate mass throughout the mold;
 wherein the aerated chocolate mass has an aeration level of at least about 8 percent; and
 the chocolate mass completely fills the mold in a horizontal direction.

9. The method in accordance with claim 8, wherein the aeration level of the confectionery mass is between 8 percent to 13 percent.

10. The method in accordance with claim 8, wherein the aerated confectionery mass has a density that is up to 13 percent less than a density of a non-aerated confectionery mass.

11. The method in accordance with claim 8, wherein the confectionery product has a width to thickness ratio above 5.

12. The method in accordance with claim 8, further comprising depositing the aerated confectionery mass into the mold as a second strip adjacent to the at least one strip already deposited in the mold to completely fill the mold in the horizontal direction.

13. The method in accordance with claim 8, wherein the confectionery mass is deposited from a discharge outlet in a vertical direction.

14. A method of preparing an aerated chocolate confectionery product, the method comprising:
 (1) preparing a flowing aerated chocolate mass;
 (2) passing the aerated chocolate mass through at least one discharge passageway to at least one elongated discharge outlet, wherein the at least one elongated discharge outlet forms the aerated chocolate mass into at least one strip of aerated chocolate;
 (3) depositing the at least one strip in a vertical direction into a mold having a bottom part and side walls forming a mold cavity of a desired thickness, desired width, and desired length, the mold moving relative to the elongated discharge outlet, wherein the at least one strip has sufficient length and width to form an initial layer of aerated chocolate covering the bottom part of the mold cavity such that it is completely covered in a horizontal direction;
 (4) repeating steps 2 to 3 to deposit additional strips on the initial layer of aerated chocolate to form additional layers of aerated chocolate until a final strip of aerated chocolate is deposited to form a final layer such that the final layer reaches the desired thickness of the cavity, thereby forming the aerated chocolate confectionery product; and
 (5) removing the aerated chocolate confectionery product from the mold;
 wherein the strips forming the initial, additional, and final layers have a width in the range of 5 to 500 mm and a thickness in the range of 0.5 to 100 mm;
 wherein shaking or vibrating the mold or the strips deposited in the mold is not required to distribute the aerated chocolate throughout the mold cavity; and
 wherein the aerated chocolate product has an aeration level of at least 8 percent.

15. A method of manufacturing a flowing aerated chocolate mass using a machine comprising an apparatus for depositing the flowing aerated chocolate mass, having at least one discharge passageway diverging towards the discharge into at least one discharge outlet in its longitudinal direction (L), and
 at least one conveyor moving a plurality of molds relative to the apparatus,
 wherein the mold is completely filled with the mass in a horizontal direction while the mold is free of vibration from a vibrator and wherein the extent of de-aeration for the aerated chocolate mass in the mold is reduced as compared to the same chocolate mass that undergoes vibration from a vibrator in the molds.

* * * * *

UNITED STATES PATENT AND TRADEMARK OFFICE
CERTIFICATE OF CORRECTION

Page 1 of 1

PATENT NO. : 8,658,233 B2
APPLICATION NO. : 12/176091
DATED : February 25, 2014
INVENTOR(S) : Melis Abylov and Juraj Durco It is certified that error appears in the above-identified patent and that said Letters Patent is hereby corrected as shown below:

IN THE CLAIMS:

Column 7, line 29, in claim 8, after "least" delete "about".

Signed and Sealed this
Ninth Day of September, 2014

Michelle K. Lee
*Deputy Director of the United States Patent and Trademark Office*